Jan. 24, 1956 — L. S. MOODY — 2,732,338
OXIDATION OF ORGANIC COMPOUNDS
Filed April 14, 1953
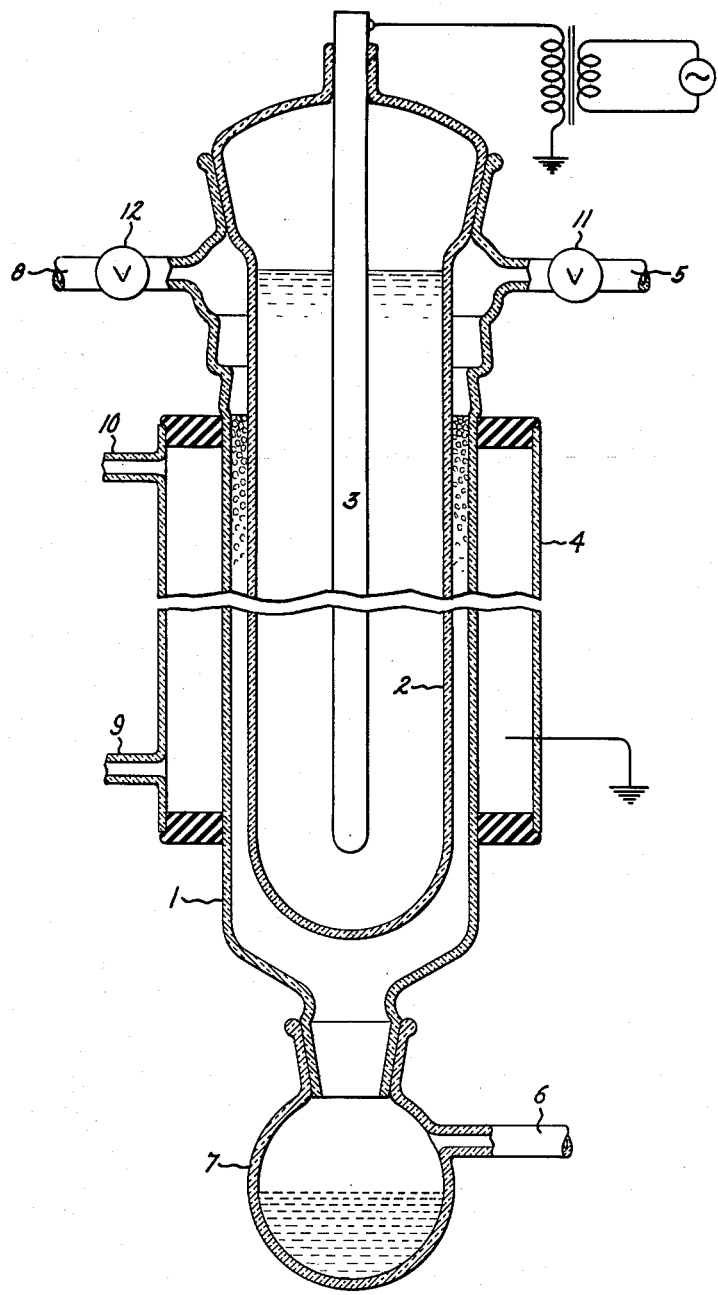
Inventor:
Leroy S. Moody,
by Anselm Cohn
His Attorney.

es Patent Office 2,732,338
Patented Jan. 24, 1956

2,732,338

OXIDATION OF ORGANIC COMPOUNDS

Leroy S. Moody, Pittsfield, Mass., assignor to General Electric Company, a corporation of New York Application April 14, 1953, Serial No. 348,639

15 Claims. (Cl. 204—165)

This invention relates to a new and improved method of preparing oxygenated organic compounds. More particularly the invention is concerned with the method of preparing oxygenated organic compounds which comprises activating the oxygen normally present in an oxygen-containing gas, by means of a silent electric discharge, to a more highly reactive form of oxygen and reacting the resulting gas substantially simultaneously as formed with an organic compound.

Although the oxidation of organic compounds with a higher order of an oxygen-containing gas such as ozone has been previously described, no satisfactory method for obtaining such oxidation has previously been known. It has heretofore been common practice to generate separately some more highly reactive oxygen-containing gas such as ozone, in one of the readily available commercial ozonizers, by subjecting an oxygen-containing gas, usually air or oxygen per se, to the effect of a silent electric discharge. Ozone, thus formed, has then been reacted with various organic compounds exclusively of the ozone generator. Other less preferred methods have employed ozone available commercially. These methods have proven unsatisfactory, among other reasons, due to the instability of ozone, when stored, and due to high losses of generated ozone when provided by silent electric discharge because of the adverse effect of the electric discharge on the ozone as it is formed. These methods are further disadvantageous in requiring extensive and expensive apparatus.

It has now unexpectedly been discovered that the half-life of ozone is extremely short under the effect of the generating means, the discharge itself, and that in order to fully utilize it, it must come into contact with a receptive reactant as quickly as formed. Additionally, there exists uncertainty as to the exact nature of an oxygen-containing gas after it has been subjected to silent electric discharge and it is preferred to refer hereinafter to such an electrically discharged oxygen-containing gas as the reactive gas, as distinguished from the feed gas, rather than as ozone specifically.

The present invention overcomes these prior art deficiencies by providing a one step method of preparing oxygenated organic compounds comprising running an oxygen-containing feed gas into a reaction zone, such zone being part of an ozone generator hereinbelow described, in a manner enabling the feed gas to pass between a system of electrodes which provide a silent electric discharge. A stream of a selected organic compound is similarly run into this same generator at the same time and caused to flow between the aforementioned electrodes where it comes into contact with and reacts with a more highly reactive form of oxygen, namely, the reactive gas, formed by the effect of the silent electric discharge on the oxygen originally present in the feed gas. When operating in the manner broadly described, reactive gas losses are cut to a minimum with a higher proportional product yield for organic compound charged.

The process of this invention may be carried out in any of the commercially available ozone generators, limited in dimensions only by production requirements. Included are generators in which, when used as ozone generators exclusively, ozone is produced by means of 60 cycle electric discharge between concentric electrodes in which the electric discharge current is terminated at one end (Frolich-type) or at both ends (Siemens-type) by an insulating layer such as glass or porcelain.

A generator similar to that described in the copending application, Serial No. 344,950, of David W. Caird, filed concurrently herewith and assigned to the assignee of the present invention is preferred. The operation of this generator, exclusive of the reactions performed therein, is similar to that disclosed in the aforementioned copending application.

Although the preferred generator, described in detail below and illustrated in the figure, is of the concentric glass type and requires a countercurrent method of reaction, generators of this invention are not limited thereto since the same design may be incorporated into generators having a parallel plate geometry or it may be incorporated into generators of the parallel plate type or of the concentric tube type having a tapered or conical electrode geometry respectively. Additionally, the preferred design may also be incorporated into units having only one or both electrodes covered with any suitable dielectric material, e. g., glass (Pyrex, Vycor, soft glass, etc.) quartz, ceramic, etc. Methods other than countercurrent flow of reactants, one to the other, such as concurrent, concomitant, etc., may also be employed, although countercurrent flow is the preferred method.

Referring now to the drawing in detail, the figure is a diagrammatic illustration in vertical section of a preferred generator. This generator is provided with two concentric tubes, specifically, an outer glass dielectric tube 1 and an inner glass dielectric tube 2, with a variable gap space between. This last mentioned gap space can be varied by using inner tubes of varying diameter. This space may or may not be packed with any suitable packing, for example, glass beads, depending upon the organic compound selected, in order to improve organic compound gas contact. A high voltage electrode 3, is furnished by means of an electrolyte such as an aqueous salt solution within the inner tube in combination with a brass rod which extends to the bottom of the inner tube and which is connected to the high voltage terminal of a transformer. A ground potential electrode, 4, is provided by the water, circulating in a water jacket surrounding outer tube 1. Additionally, the water also serves to partially cool the generator or to heat it, as the case may be. Inlet 5 is provided in the upper portion of tube 1 for introducing an organic compound. Organic feed, entering through inlet 5, distributes itself on the surface of tube 1 in the form of a reactive film. Simultaneously with the introduction of the organic feed, an oxygen-containing gas is introduced through an inlet tube 6, connected to and extending away from receiver 7, and flows upwardly between the aforementioned electrodes where it meets the downcoming organic feed in the area defined by water jacket 4. Under the influence of the silent electric discharge resulting from the electrodes, oxygen contained in the feed gas is converted to the previously described reactive gas, which gas proceeds to react with the organic feed as fast as it is generated. Product is formed almost immediately and is collected in receiver 7. Pressure within the generator is controlled by adjusting the flow of feed gas into the generator and venting the outgas through an outlet 8 by means of a valve 12. Carbon monoxide and carbon dioxide, which in some cases may be formed in small quantities during operation, are flushed from the generator, through outlet 8, by a small feed gas "bleed" to prevent vapor lock from shutting off the feed gas. Water, for either cooling or heating as well as for use as a ground potential electrode, is circulated through the water jacket by means of inlets 9 and 10, respectively.

In order to obtain optimum operation, an equilibrium should be established between organic feed input and product recovery by conditioning each run for 1½ to 2 hours at operating voltage preferably about 33 kv. although higher or lower voltages may be used, as for example, from about 27 to 35 kv. This conditioning forearm may be recirculated to the generator through organic feed inlet 5. Although oxygenated products are formed almost immediately, 20 to 30 minutes usually elapse before product begins to leave the described generator, and about one hour is required before product begins to drain into the receiver at a constant rate.

In carrying the present invention into effect, various oxygen-containing feed gases can be used, for example, air, oxygen per se, and oxygen in admixture with an inert diluent gas, e. g., nitrogen, argon, neon, etc., or mixtures of these first mentioned gases with or without an inert diluent gas. Pressure under which these gases may be employed is subject to extremely wide variations dependent upon the particular reactants undergoing reaction. Ordinarily, any pressure below that which will produce an explosive mixture with the organic compound may be used. Pressures just below atmospheric and as low as 1/100 atmospheres, have been successfully used in some reactions, while atmospheric pressure or above, up to 30 atmospheres, has been successfully used in others. Nevertheless, pressure does have an important effect and it is highly desirable that for each particular reaction a pressure be selected at which that reaction proceeds efficiently.

The temperature, in most reactions thus far conducted, has been about room temperature at the start of the reaction. Depending upon the material reacted, the reaction may require the application of heat or may require cooling. Either may be accomplished by circulating either hot or cold water in the aforedescribed water jacket. It is to be understood, however, that the course of the reactions involved is often materially affected by temperature in the same manner as in ordinary chemical reactions and hence it is within the scope of this invention to regulate the temperatures, either upwardly or downwardly, such as the case may be. However, we have found that for most compounds reacted a preferred range of temperature is from $-76°$ C. to $110°$ C. Within this range, best results are obtained at a very low temperature since low temperatures give rise to fewer less desirable sideproducts. When operating at around zero degrees centigrade or below, a ground potential electrode other than water must be used. This may consist of an external conducting metal electrode in combination with a cooling liquid.

The rates of addition of feed gas (i. e., gas to be converted to the reactive gas) and organic compound may be varied within broad limits. However, we have found that for optimum operation an excess of feed gas over that required to furnish sufficient reactive gas for the quantity of organic compound present between the electrodes at any one time should be charged. As mentioned above, the rate of organic feed is adjusted to provide an equilibrium between the feed and the product. More particularly, the organic feed is introduced at a rate equal to product recovery, while the rate of recovery of product depends upon certain variables such as the size of the generator, the organic compound selected, the length of the space defined by the concentric tubes, the concentration of activated oxygen in the reactive gas, the power input, etc. With respect to the residence time of the reactants and products formed therefrom between the electrodes, the preferred residence time is as short as possible to prevent subsequent decomposition of the products by the discharge. However, this again is a function of the length of the column, the diameter of the outer dielectric tube, the viscosity of the particular product, and other factors.

As the organic compound to be reacted, any organic compound which is liquid under the reaction conditions can be employed. Broadly stated, these compounds may be grouped into two main groups, namely saturated and unsaturated organic compounds. In view of the wide range of temperatures and pressures which are feasible, depending upon the compound selected, compounds normally gaseous but liquid within the disclosed pressure range and compounds normally solid but liquid within the disclosed temperature range may also be used in our process.

Illustrative examples of some unsaturated organic compounds or mixtures of unsaturated organic compounds that may be used include any compound having at least one carbon-to-carbon unsaturated bond, and meeting the physical requirements set forth above, such as the following: aliphatic acids such as acrylic, crotonic, hexadecenoic, oleic, elaidic, linoleic, ricinoleic, etc., acids and esters thereof, esters of discarboxyglic acids such as maleic, etc., aldehydes such as acrolein, crotonaldehyde, citral, etc., homologous olefins such as pentene, hexene, octene, decene, undecene, etc., both straight and branched chain, mixtures of unsaturated materials present in tall oil and the like, terpenes, and cyclic hydrocarbons such as cyclohexene and others.

In addition one may employ as the organic feed saturated organic compounds which meet the physical requirements recited for the above-listed unsaturated compounds, as, e. g., aliphatic acids starting with propionic and including all those through stearic, dibasic acids such as glutaric, pimelic and azelaic and esters of both the mono and dibasic acids, homologous ketones starting with acetone and including all through octadecone, all aliphatic liquid hydrocarbons from hexane up to solid hydrocarbons, etc., hydroaromatics such as cyclohexane, decaline, etc., and all of the aliphatic alcohols starting with methyl up through and including stearyl alcohol.

While many specific examples of saturated and unsaturated compounds have been enumerated above it is to be understood that the invention is neither limited to these nor to those shown in working examples below since any organic compound meeting the herein expressed criteria may be employed.

The products obtainable by the process of this invention, broadly described, are oxygenated organic compounds. However, the initial recoverable products obtained from unsaturates differ from those obtained from saturates. Whereas saturated compounds usually give rise to acids, per-acids, peroxides, aldehydes, ketones, esters, etc., unsaturated compounds generally give compounds known as "ozonides" or "perozonides" which have utility per se, for example, as polymerization catalysts or which may be further reacted to give compounds similar to those mentioned for saturates. In using the terms "ozonide" and "perozonide" we intend connotation presently known to the art which recognizes an ozonide or perozonide as the products of the addition of an activated form of oxygen, ozone for instance, to a molecule whose structure includes at least one carbon-carbon multiple bond. The so-called "normal ozonide" contains the grouping $>CO_3C<$ although frequently ozonides do not analyze as containing only three atoms of oxygen. If more than three atoms of oxygen have been added to the molecule, per multiple, e. g., double bond, the product may consist wholly or in part of "perozonides," which term merely signifies that the number of oxygen atoms added, per multiple bond, is an integer greater than three. However, the exact structures of ozonides and perozonides are not known with certainty. Some theories on their constitution are discussed by Long in Chemical Reviews, vol. 27, pages 437–495 (1940).

In order that those skilled in the art better may understand how the present invention may be carried into effect, the following examples are given by way of illustration and not by way of limitation. In each of the examples, the generator illustrated in accompanying Figure 1 was employed.

*Example 1*

In a continuous, countercurrent method of operation wherein organic feed and oxygen were introduced countercurrently to each other through inlets detailed in the description of Figure 1, a total of 148.5 grams of oleic acid at a constant hourly rate and oxygen at a flow rate of 3.4 liters per hour were charged to the generator over an eighteen hour period. During this period an operating voltage of approximately 33 kv. was maintained. The oxygen feed gas was under a slightly elevated pressure of 2-3 pounds per square inch guage and oleic feed temperature was maintained at approximately room temperature. The outgas, containing negligible reactive gas, was adjusted to 2.5 liters of oxygen per hour and was recirculated to the feed gas line. The rate of oxygen absorption was 0.9 liter per hour, equivalent to 1.18 grams of reactive gas per hour.

At the end of the period indicated (18 hours), a total of 170.24 grams of oleic acid ozonide had been collected at a constant hourly rate of recovery, without interrupting the operation. This sample product assayed 86 per cent oleic acid ozonide (by volume) on the basis of weight gain, and 83 per cent oleic acid ozonide (by volume) on the basis of refractive index measurements. The average of these tests was equivalent to an absorption of 1.17 grams of reactive gas per hour.

*Example 2*

Using the same operating conditions described in Example 1, 34.4 grams per hour of diethyl maleate were reacted with a quantity of generated reactive gas, expressed in grams, of 9.6 grams per hour. Ozonide product was removed at the rate of 44.0 grams per hour and analyzed 100 per cent diethyl maleate ozonide.

*Example 3*

Using the apparatus and procedure described in the foregoing examples, we have also successfully prepared in good yields, ozonides of tall oil, methyl oleate, linoleic acid, ricinoleic acid and elaidic acid. In these examples, air and oxygen per se were used as the oxygen-containing feed gases.

In each of the following examples, saturated organic compounds were employed, and the apparatus and procedure were the same as in the foregoing examples. Individual isolation of products was not attempted and analysis was in terms of the acidity and peroxide content of the normally expected acids and peroxides. The acidity of the product was measured by titration with standard sodium hydroxide, using phenolphthalein indicator. The peroxide content was determined by heating the material to boiling in a potassium iodide-acetic acid solution and titrating the liberated iodine with sodium thiosulfate. Acidity was reported as equivalents of acid per mole of saturated compound charged, and peroxide content as atoms of active oxygen per mole of saturated compound charged.

*Example 4*

Two runs, identified as A and B, were conducted using octanol-2 as the organic feed. In run A the generator was packed with 1 mm. glass beads, whereas it was unpacked during run B. The air gas feed was under a pressure of 2-3 pounds per square inch gauge. The expected products were, among others, acetic, formic, caproic, and enanthic acids, peracids of these acids, and sec-octyl peroxides. Although individual isolation was not attempted, as previously mentioned, analysis in the manner described above did establish the production of acids and peroxides.

Run A:

Octanol-2 _____ Fed at rate of 6.0 grams per hour.
Air _____ Fed at rate of 8.0 liters per hour.
Acidity of product ____ 0.05 equivalent of acid per mole.
Peroxides in product __ 0.04 atom active oxygen per mole.

Run B:

Octanol-2 _____ Fed at rate of 4-5 grams per hour.
Air _____ Fed at rate of 9-10 liters per hour.
Acidity of product ____ 0.05 equivalent of acid per mole.
Peroxides in product __ 0.15 atom active oxygen per mole.

*Example 5*

Two runs, A and B, were conducted using octanol-1 as the feed. Products normally to be expected were caprylic acid, n-octyl peroxide and percaprylic acid. Analysis for acidity and peroxide content indicated that acids and peroxides were produced. In both runs, the generator was packed with glass beads.

Run A:

Octanol-1 _____ Fed at rate of 5.2 grams per hour.
Air _____ Fed at rate of 7.0 liters per hour.
Acidity of product ____ 0.06 equivalent of acid per mole.
Peroxides in product __ 0.06 atom active oxygen per mole.

Run B:

Octanol-1 _____ Fed at rate of 3.0 grams per hour.
Air _____ Fed at rate of 18.0 liters per hour.
Acidity of product ____ 0.07 equivalent of acid per mole.
Peroxides in product __ 0.07 atom active oxygen per mole.

*Example 6*

Employing 2-ethylhexoic acid as the organic feed, the expected product was perethylhexoic acid. Cleavage of the feed to compounds of shorter chain length was not expected to occur. Analysis of the product showed that some peroxide was formed, but no lower molecular weight acids were evident, indicating that cleavage of the feed to smaller molecules had not occurred.

2-ethylhexoic acid ____ Fed at rate of 5.0 grams per hour.
Air _____ Fed at rate of 18.0 liters per hour.
Acidity of product (neutral equivalent). _____ Same as charged material.
Peroxides in product __ 0.02 atom active oxygen per mole.

*Example 7*

Using octanone-2 as organic feed, expected products, among others, were formic, acetic, caproic and enanthic acids, octanone peroxide or polymeric peroxides thereof and peracids corresponding to the acids last mentioned. The acidity and peroxide tests established the presence of acids and peroxides in the product.

Octanone-2 _____ Fed at rate of 2 grams per hour.
Air _____ Fed at rate of 16 liters per hour.
Acidity of product ____ 0.05 equivalent of acid per mole.
Peroxides in product _____ .06 atom oxygen per mole.

*Example 8*

Employing diethyl malonate as feed, peroxides were normally to be expected but no reasonable prediction could be made as to their nature. However, analysis did disclose some peroxidation.

Diethyl malonate ____ Fed at rate of 7.0 grams per hour.
Air _____ Fed at rate of 14.0 liters per hour.
Acidity of product _____ Trace, nearly the same as feed material.
Peroxides in product _____ 0.01 atom oxygen per mole.

*Example 9*

With diphenylmethane as feed, expected products were benzoic acid, perbenzoic acid and benzoyl peroxide as well as benzophenone peroxides. The presence of acids and peroxides in the product was indicated by the acidity and peroxide tests, respectively.

Diphenyl methane ___ Fed at rate of 6–7 grams per hour.
Air _____ Fed at rate of 14 liters per hour.
Acidity of product ____ 0.06 equivalent of acid per mole.
Peroxides in product _____ 0.03 atom oxygen per mole.

*Example 10*

Using n-hexadecane, expected products were a mixture of acids and peroxides from $C_1$ to $C_{16}$, as well as other oxygenated materials. Analysis indicated acids and peroxides in the product mixture.

n-Hexadecane _____ Fed at rate of 4 grams per hour.
Air _____ Fed at rate of 100 liters per hour.
Acidity of product ____ 0.07 equivalent of acid per mole.
Peroxides in product _____ 0.04 atom oxygen per mole.

Although the reactions in the foregoing examples were conducted in the absence of solvents, in certain instances, suitable inert organic solvents may be employed. In the following examples using the apparatus and techniques of the foregoing examples, illustrative solvents are employed.

*Example 11*

A 15% solution of liquid polybutadiene in a high boiling paraffin oil (Cenco Hyvac oil) was ozonized in the manner of the foregoing examples. The product, after oxidative cleavage, yielded 0.20 to 0.25 equivalent of acid per mole of polybutadiene charged. Further analysis revealed a major portion of the product to be formic acid.

*Example 12*

A 15% solution of polybutadiene in dibutyl glutarate was ozonized and the ozonide cleaved. The results were similar to that obtained in Example 11. 89% of the theoretical amount of oxygen was taken up during ozonization. The cleaved product analyzed as containing 0.4 equivalent of acid for each mole of polybutadiene charged.

From the foregoing description taken with the examples, advantages in our process over prior methods are apparent. Possibly the most important advantage in operating according to an "in situ" method lies in the high oxygen utilization of that oxygen initially present in the feed gas. This is believed due to the generation of a reactive gas, possibly ozone per se, under conditions that its opportunity to react is very great, compared with the half life of an ozone molecule in a generator when the generator is operated solely as an ozone generator, in the absence of an organic compound. The short half life of ozone per se in a generator is believed to be due to the adverse effect that the silent electric discharge has on the ozone after its formation. It logically follows that the rate of reaction of the reactive gas, produced in our generator, whether it be ozone per se or some other oxygen-containing substance, with an organic compound, present during its formation, is much greater than the half life of decomposition of ozone in a generator in the absence of an organic compound. This is possibly the major reason that the net ozone production of a generator is small in spite of the considerable quantity usually generated and of prime importance in reacting it as rapidly as it is produced.

Organic ozonides, produced by the methods herein disclosed and claimed, have a wide field of utility. They can be used, for instance, as intermediates in the production of other oxygenated compounds by a mild oxidative ring cleavage, and as polymerization catalysts, for instance, as substitutes for organic peroxides. They may also be used as bleaching agents for vegetable oils, acetate rayon and wool, as bacterial and fungicidal materials, as curing agents for natural and synthetic rubber including silicone rubber, as oxidation agents, etc.

What I claim as new and desire to secure by Letters Patent of the United States is:

1. In a continuous, countercurrent method of preparing oxygenated organic compounds employing as a reactor an ozone generator producing a continuous silent electric discharge, the steps which comprise reacting a liquid organic compound with a reactive oxygen containing gas continuously produced by the influence of said silent electric discharge on an oxygen containing feed gas, said electric discharge being continuously produced by electrodes forming integral parts of said generator, said generator being operated at a voltage of 27 to 35 kv, said feed gas being continuously introduced into the said generator, under a pressure of $\frac{1}{100}$ to 30 atmospheres, through an inlet positioned below the midpoint of said generator, said organic compound, at a temperature of —76° C. to 110° C., being continuously introduced into said generator through an inlet positioned above the midpoint of said generator, the introduction of said reactants being simultaneous and countercurrent to one another, said organic compound always being available in sufficient quantity to react with said reactive gas as rapidly as generated, continuously recovering oxygenated organic compounds as rapidly as produced, and continuously recirculating an outgas, comprised of unreacted feed gas containing only a negligible quantity of reactive gas, to the said feed gas inlet of the generator.

2. In a continuous, countercurrent method of preparing oxygenated organic compounds employing as a reactor an ozone generator producing a continuous silent electric discharge, the steps which comprise reacting a saturated liquid organic compound with a reactive oxygen-containing gas continuously produced by the influence of said silent electric discharge on an oxygen-containing feed gas, said electric discharge being continuously produced by concentric electrodes forming integral parts of said generator, said generator being operated at a voltage of 27 to 35 kv., said feed gas being continuously introduced into the said generator under a pressure of $\frac{1}{100}$ to 30 atmospheres, through an inlet positioned below the midpoint of said generator, said saturated organic compound, at a temperature of —76° C. to 110° C., being continuously introduced into said generator through an inlet positioned above the midpoint of said generator, the introduction of said reactants being simultaneous and countercurrent to one another, said saturated organic compound always being available in sufficient quantity to react with said reactive gas as rapidly as generated, continuously recovering said oxygenated organic compounds as rapidly as produced, and continuously recirculating an outgas, comprised of unreacted feed gas containing only a negligible quantity of reactive gas, to the said feed gas inlet of the generator.

3. In a continuous, countercurrent method of preparing oxygenated organic compounds selected from the group consisting of organic ozonides and perozonides, employing as a reactor an ozone generator producing a continuous silent electric discharge, the steps which comprise reacting a liquid unsaturated organic compound with a reactive oxygen-containing gas continuously produced by the influence of said continuous silent electric discharge on an oxygen-containing feed gas, said electric discharge being continuously produced by concentric electrodes forming integral parts of said generator, said generator being operated at a voltage of 27 to 35 kv., said feed gas being continuously introduced into the said generator, under a pressure of $\frac{1}{100}$ to 30 atmospheres, through an inlet positioned below the midpoint of said generator, said unsaturated organic compound, at a temperature of —76° C. to 110° C., being continuously introduced into said generator through an inlet positioned above the midpoint of said generator, the introduction of said feed gas and said unsaturated compound being simultaneous and in countercurrent flow to one another, said unsaturated organic compound always being present in sufficient quantity to react with said reactive gas at the point of generation of said reactive gas as rapidly as generated, continuously recovering said oxygenated compounds as rapidly as produced, and continuously recirculating an outgas, comprised of unreacted feed gas containing only a negligible quantity of reactive gas, to the said feed gas inlet of the generator.

4. The process of claim 1 in which the feed gas is oxygen.

5. The process of claim 1 in which the feed gas is air.

6. The process of claim 2 in which the feed gas is oxygen.

7. The process of claim 2 in which the feed gas is air.

8. The process of claim 3 in which the feed gas is oxygen.

9. The process of claim 3 in which the feed gas is air.

10. In a continuous, countercurrent method of producing organic ozonides, employing as a reactor an ozone generator producing a silent electric discharge, the steps which comprise reacting a liquid unsaturated organic compound selected from the group consisting of tall oil, unsaturated aliphatic acids and their esters, unsaturated aldehydes, unsaturated ketones and olefins, with a reactive oxygen containing gas continuously produced by the influence of said continuous silent electric discharge on an oxygen containing feed gas, said generator being operated at a voltage of 27 to 35 kv., said electric discharge being continuously produced by concentric electrodes forming integral parts of said generator, said feed gas being continuously introduced into said generator through an inlet positioned below the midpoint of said generator under a pressure of $1/100$ to 30 atmospheres, said unsaturated organic compound being continuously introduced into said generator at a temperature of $-76°$ C. to $110°$ C. through an inlet positioned above the midpoint of said generator, the introduction of said feed gas and said unsaturated compound being simultaneous and in countercurrent flow to one another, said unsaturated organic compound always being present in sufficient quantity to react with said reactive gas at the point of generation of said reactive gas as rapidly as generated, and continuously recovering said oxygenated compounds as rapidly as produced.

11. The method of claim 2 in which the saturated liquid organic compound is octanol $-1$.

12. The method of claim 2 in which the saturated liquid organic compound is octanol $-2$.

13. The method of claim 3 in which the liquid unsaturated organic compound is oleic acid.

14. The method of claim 3 in which the liquid unsaturated organic compound is diethyl maleate.

15. The method of claim 2 in which the liquid organic saturated compound is octanone $-2$.

References Cited in the file of this patent

UNITED STATES PATENTS

| | | |
|---|---|---|
| 1,180,372 | Breydel | Apr. 25, 1916 |
| 1,500,080 | Kloppenburg | July 1, 1924 |
| 1,710,155 | Egloff et al. | Apr. 23, 1929 |
| 2,108,030 | Darrah | Feb. 8, 1938 |
| 2,271,895 | Hartman | Feb. 3, 1942 |